United States Patent [19]

Rottacker et al.

[11] 3,842,472

[45] Oct. 22, 1974

[54] METHOD AND APPARATUS FOR ASSEMBLING BALL BEARINGS

[75] Inventors: Walter Rottacker; Frieder Kordowich, both of Stuttgart; Karl Hettich, Wolfsolten, all of Germany

[73] Assignee: SKF Industrial Trading and Development Company B. V., Amsterdam, Netherlands

[22] Filed: July 9, 1973

[21] Appl. No.: 377,203

[30] Foreign Application Priority Data

July 7, 1972 Germany .......................... 2233378

[52] U.S. Cl. .............................. 29/148.4 A, 29/201

[51] Int. Cl. ........................ B23p 11/00, B23p 19/04

[58] Field of Search ........ 29/148.4 A, 201, 148.4 R, 29/201 D

[56] References Cited

UNITED STATES PATENTS

| | | | |
|---|---|---|---|
| 822,723 | 6/1906 | Conrad | 308/198 X |
| 838,303 | 12/1906 | Conrad | 29/148.4 A |
| 2,885,767 | 5/1959 | Barish | 29/148.4 A |
| 3,783,482 | 1/1974 | Kunert | 29/148.4 A |

*Primary Examiner*—Thomas H. Eager
*Attorney, Agent, or Firm*—Murray Schaffer

[57] ABSTRACT

Method and apparatus for assembling ball bearings wherein the inner and outer rings are eccentrically supported on a table, so as to form a crescent-shaped space. The balls are delivered through a delivery channel, extending upwardly through the table by a reciprocating piston. An arcuate-shaped supporting segment is insertable between the rings and pneumatic or fluid stream is employed to apportion the balls and shift the rings.

10 Claims, 1 Drawing Figure

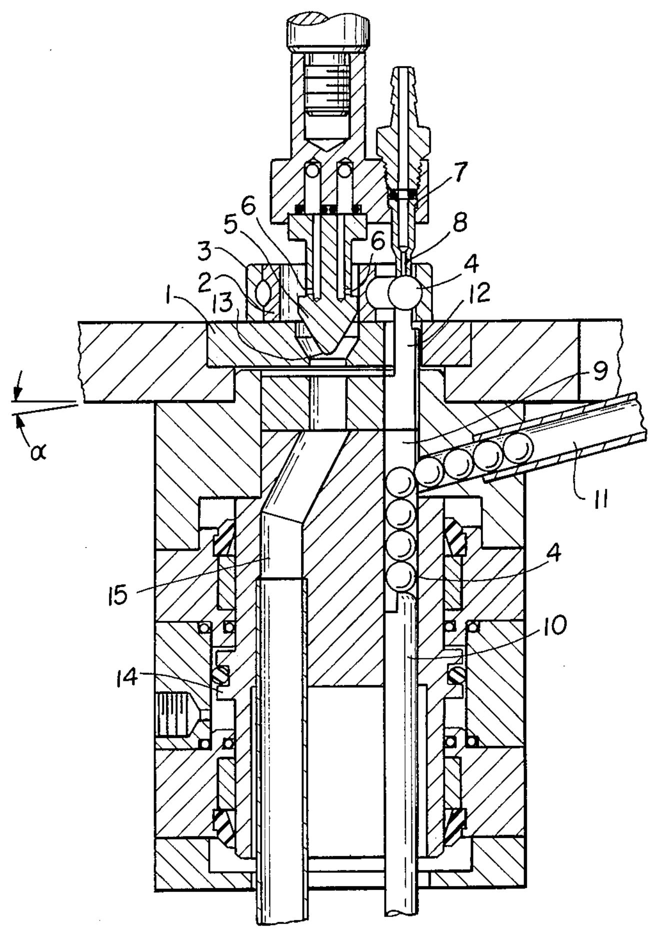
7
8
6
5
6
3
4
2
12
1
13
9
α
11
4
15
10
14

METHOD AND APPARATUS FOR ASSEMBLING BALL BEARINGS

BACKGROUND OF INVENTION

The present invention relates to a method and apparatus for automatically assembling rolling bearigs and, in particular, to a method and apparatus for inserting the balls therefor between the race rings of a ball bearing.

In assembling ball bearings, particularly the ball bearings having grooved race rings, it is customary to arrange one race ring eccentrically one within the other and to insert the balls into the crescent-shaped space thus formed. Generally, an arcuate segment is inserted between the rings to hold the balls in the correct position and height. The balls are thereafter allowed to freely fall into the space between the race rings, either directly onto the arcuate segment, or indirectly, after rebounding from the race rings and their edges. This technique results in considerable damage to the balls. Furthermore, during the subsequent centering of the inner ring, the danger is increased that the balls and/or the race surfaces of the bearing rings will be damaged. Loose or poorly arranged balls require the use of considerable force, to center the inner ring. When the ideal geometric form of the roller body itself and/or its race surfaces are damaged, the operation of the bearing is faulty and unequal outer forces are created. Therefore, such bearings will not be able to meet the highest standards and exacting requirements necessarily expected in their normal use. In the past it was only possible to obtain a distortion and damage-free ball bearing, having the highest degree of noise-free and friction-free operation, only through hand assembly.

It is an object of the present invention to provide a method and apparatus for assembling ball bearings in which damage to the roller body and/or the race surfaces of the bearing rings is prevented.

It is a further object of the present invention to provide a method and apparatus for assembling ball bearings, automatically and without the necessity of employing an expensive time-consuming and complex hand operation.

It is a further object of the present invention to provide a method and apparatus for assembling ball bearings which, in general, overcomes the disadvantages and defects of the prior art.

These objects, and other objects, as well as numerous advantages, will be seen from the following disclosure.

SUMMARY OF INVENTION

In accordance with the present invention, a method is provided for assembling ball bearings and particularly for inserting the balls between the race rings of ball bearings wherein the balls are delivered between the race rings from beneath the bearing. This solution has the advantage that at no time and in no position are the balls allowed to freely fall into the space between the race rings. As a consequence, the present invention provides a method wherein it is no longer possible for the balls or the race rings to be damaged.

The insertion of the balls between the race rings is accelerated by feeding the balls pair-wise through two parallel channels. This has the further advantage that the balls in a simple manner can be apportioned in the crescent-shaped space which to this end is advantageously inclined to the horizontal.

In order to provide a protective handling of the balls during their apportionment between both eccentric bearing rings, the balls are held and apportioned during the insertion by a stream of compressed air or pressurized fluid against the race groove or surface of the outer bearing ring in combination with the support of an arcuate segment extending into the crescent-shaped space. By this technique, the balls can be apportioned without the use of any mechanical outer forces thereon. A further advantage arises from this procedure in that the apportioning of the balls is made to occur on the greatest possible diameter, i.e., the balls lie against the race surface of the outer bearing ring and are caused to arrange themselves in a row one behind the other, so that the subsequent centering of the inner ring with respect to the outer ring can be facilitated.

According to the present invention, the inner ring is shifted eccentrically by the use of compressed air or pressurized fluid before the balls are delivered and is again shifted to its centered position by the use of the compressed air or pressurized fluid. This has the advantage that the centering of the inner ring is effected without the use of extraordinarily large forces. The use of compressed air or the pressurized fluid enables the inner ring to seek its proper position by itself through the balls which are apportioned along the greatest possible diameter; no mechanical forces are placed upon the inner ring. In the event loose or poorly positioned balls occur, the centering of the inner ring would not be possible without a strong working force in excess of the compressed stream of fluid. The bearing will in this condition remain unmounted and will be automatically rejected.

A novel and improved apparatus is provided for carrying out the afore-described method. The apparatus comprises a supporting table for the bearing rings, which table is inclined with respect to the horizontal and on which the rings may be eccentrically positioned. At least one channel extends from below the table perpendicularly to it, to which the balls are fed. Slidable within the channels is a plunger member which elevates the balls into the crescent-shaped space between the eccentrically lying bearing rings. Preferably the vertical channels are provided in an arcuate segment which is reciprocally movable into the crescent-shaped space. The upper face of the crescent-shaped member has a grooved surface which cooperates with the race surface of the outer ring to form a curved supporting surface on which the balls may come to reat and be held, yet movable along the arc of the crescent. Through this construction, the arcuate-shaped segment comprises the filling conveyer through which the balls can ride to the left and right and be apportioned along the greatest possible diameter so that the subsequent centering of the inner ring can be further facilitated.

Extending into the crescent-shaped space is a nozzle for pressurized air of fluid having two opposing outlets directed substantially tangential to the race surfaces of the outer race ring. This nozzle impinges a stream on the balls to facilitate this division. To shift and center the inner ring a further nozzle is provided extending through the bore of the inner ring. This second nozzle is provided with two radially opposed independent outlets, allowing the pressurized air or fluid to be impinged upon opposing sides of the inner race ring causing it to shift as selected.

Full details of the present invention are set forth in the following description and are illustrated in the accompanying drawing.

BRIEF DESCRIPTION OF DRAWING

In the drawng the FIGURE comprises a vertical sectional view through the apparatus according to the present invention.

DESCRIPTION OF INVENTION

The method of the present invention is easily illustrated from a description of the structure and function of the apparatus.

As seen in the FIGURE, the apparatus comprises a supporting table 1 for the bearing. The table 1 may be one of a plural number mounted in a machine frame or housing so as to be inclined at an angle $\alpha$ (of: approximately 10°) to the horizontal. The bearing comprises an inner ring 2 and the outer ring 3 between which a plural number of balls 4 are to be located. Extending through the bore of the inner ring is a nozzle 5 which has a pair of radially opposed outlets 6. Each of the outlets 6 are connected via independent conduits to a source of compressed air or pressurized fluid which may be individually and selectively controlled to apply pressure through one or both of the outlets 6. The outlets 6 are positioned during operation at a level substantially at the center of the inner race ring, so that the inner race ring may be shifted laterally into eccentric or centered positions with respect to the outer ring. Located adjacent to the nozzle 5 is a second nozzle 7 which is axially aligned between the inner and outer race rings 2 and 3. The second fluid nozzle 7 has a pair of opposed outlets 8, which extend tangentially to the race surface of the outer ring 3 and which are connected to a source of pressurized air or fluid and which are controlled to move the balls 4 entering between the rings. Both nozzles 5 and 7 are mounted on a supporting member which is movable axially, with respect to the supporting table 1, so that the first nozzle 5 and the second nozzle 7 can be reciprocated to and from their respective positions within the central bore of the inner race ring and within the space defined between the inner and outer race rings.

Within the housing and below the supporting table 1 there extends a reciprocally movable arcuate segment 12, conforming generally to the crescent-shaped space formed between the inner and outer race ring when they are eccentrically positioned. The arcuate-shaped segment 12 is adapted to receive on its upper surface a plurality of balls 4 and to be extended within the space between the inner and outer rings at the proper height conforming to the race surface. The upper surface of the arcuate segment 12 is itself grooved so that it forms with the grooved race surface of the outer ring 3 a continuous groove on which the balls 4 can be placed at rest.

The arcuate segment 12 is supported on and is reciprocated by a piston member 14 set within a cylindrical housing 14*a* secured to the machine frame. The piston 14 is driven by compressed air or fluid delivered selectively through an inlet 14*b*. Suitable seal means with the housing 14*a* surround the piston member 14.

Extending perpendicularly to the supporting member 1 are two parallel channels 9 which run through the arcuate segment 12 and its supporting piston 14. A plunger 10 is slidably arranged in each of the channels 9, and is elevated in a selected sequence by suitable and conventional means such as a hydraulic, electric or mechanical motor means. Extending into each of the channels 9 is an inclined tubular feed channel 11, which is connected to a magazine or storage hopper (not shown) so that the balls 4 may be continuously fed to the vertical channel 9.

The central nozzle 5 is provided with a conical tip 13 which extends through a central hole 1*a*, formed in the supporting plate 1. This hole 1a is connected with a throughchannel 15, formed in the arcuate member 12 and in the body of the piston 14. The channel 15 leads to a storage bin, container or the like.

The assembly of the ball bearing according to the present invention is effected as follows:

The inner and outer rings are placed on the inclined surface of the support 1 on which suitable guide and stop means may be arranged to locate the outer race ring 3 in proper position. Thereafter the central nozzle 5 and the outer nozzle 7 are simultaneously moved from a position above the bearing into the central bore of the inner race ring 2 and between the inner and outer race ring 3, respectively. In this manner, the conical tip 13 of the central nozzle 5 extends below the nozzle 7 so thtat it securely moves within the bore of the inner ring 2, while the tip of the nozzle 7 is arranged at the level of the balls 4 in the bearing. At this time a stream of air is passed through the nozzle 5 through one of the outlet ports 6 to impinge upon the inner ring 2. As seen in the FIGURE, the air blast is directed through the left outlet port so that the inner ring is shoved eccentrically to the left with respect to the outer ring 3. This produces a crescent-shaped space between the race surfaces of the outer and inner rings on the right hand side, as seen in the FIGURE. At this point the piston 14 is activated to move the arcuate segment 12 upwardly so that it enters into the crescent shaped space to the predetermined height where its grooved upper surface forms with the grooved portion of the race surface of the outer ring 3, a continuous supporting member which will serve to hold the balls fed to it. In the following step, balls 4 are fed in equal numbers simultaneously through each of the channels 9 from below and into the crescent-shaped space between both rings. In the event an odd number of balls 4 are required to complete the ball bearing, the balls are fed in selective numbers from either or both of the channels 9.

To effect the feeding of the balls 4 the plunger 10 is employed. The distance or length of each of the channels 9 between the position of the plunger 10 in its lowermost condition and the mouth or opening of the inclined feed channel 11 is so designed and measured that for each reciprocation of the plunger 10 just so many balls 4 are permitted to enter from the channel 11 into the channel 9, which are necessary to complete the assembly of the bearing. Thus one upstroke of the plunger is necessary to deliver the exact number of balls necessary for the bearing. On the down stroke, the channel 9 becomes filled with the required number for the next bearing and assembly cycle. the lowermost position of the piston 10 can be regulated and adjusted in a known manner so that the exact number of balls necessary to be inserted within the bearing can be predetermined. During the delivery of the balls from beneath into the crescent-shaped space, air or compressed fluid is caused to flow from both of the correspondingly arranged outlet ports 8 of the nozzle 7. Since the outlets 8 are arranged tangential to the race surface of the outer ring 3, the balls 4 are caused to engage against the race surface or groove of the outer ring and to be apportioned to either side of the arcuate segment 12 being correspondingly arranged in a single row lying against the outer ring. The nozzle 7 is arranged between both channels 9 so that the pressurized air is caused to flow from both outlet ports 8 in opposite directions so that half of the number of balls are moved in one direction while the other half of the necessary number of balls are apportioned in the opposite direction.

After all the required number of balls are fed between the bearing 1 race rings, air is permitted to stream from the outlet port 6 in the central nozzle on the side of the second nozzle 7 (right side as seen in the drawing), so that the inner bearing ring is induced to shift laterally and center itself with respect to the outer bearing ring. During this movement of the inner bearing ring, no mechanical forces are placed upon the ring, but instead the bearing ring is moved under the flow of fluid so that it, itself, seeks its proper position and enables its race ring to be caused to engage against the row of balls 4. The flow of fluid within the inner bore of the inner race ring and simultaneously the flow of fluid against the balls 4 and between the race surfaces of the bearing rings produce a blanket of air which allows the shifting of the inner race ring without excessive force and allow the location of the balls 4 within the grooves of the race rings without any damage to them. After centering is accomplished, both nozzles 5 and 7 are withdrawn to a position above the bearing while the arcuate segment 12 is withdrawn to a position below the bearing so that the filled bearing can be transferred freely to the next assembly station.

The central bore 1a formed in the table 1, and the conical tip 13 of the nozzle 5 extending into it, during the assembly of the balls communicates with the elongated channel 15 formed through the piston 14. Thus, should any balls 4 inadvertently fall into the bore of the inner ring 2, then on removal of the nozzle 5, such balls will fall through the channel 15 into a suitable storage area. As a result, on completion of the bearing, the bearing will be left free of any looose, non-assembled balls and consequently a major cause of damage in conventional apparatus is avoided.

While pneumatic air or gaseous fluid is preferred, the balls and movement of the inner ring may be controlled by the use of pressurized liquid such as lubricating oil. The use of a lubricating oil has the advantage that the distribution of the balls can be better dampened so that the balls can be more easily distributed in the desired direction and number.

It will be seen from the foregoing that the method and apparatus produces many advantages. Firstly, the balls are positively delivered and held during delivery, by the combination of the vertical plunger 10, the channel 9 and the arcuate support 12. At no time are the balls freely dropped or not controlled in their movement. Secondly, only a specific predefined number, exactly needed for the bearing, are delivered to the bearing. Excess balls are held in the feed channel 11 until needed. Thirdly, the inner bearing ring is held under fluid pressure and no machanical forces are imposed on it. Other advantages will be apparent.

Many modifications and changes will also be apparent to those skilled in this art. Accordingly, the present disclosure is to be viewed as illustrative and not limiting of the scope of the invention.

What is claimed:

1. Method for assembling ball bearings comprising the steps of supporting the inner and outer race rings of a ball bearing one within the other, shifting one ring eccentrically with respect to the other to form a crescent-shaped space between the rings, and feeding a plurality of balls from beneath the bearing rings to the crescent-shaped space.

2. The method according to claim 1, including the step of delivering the balls pair-wise through two parallel channels.

3. The method according to claim 1 including the step of inclining the eccentrically lying bearing rings at an angle to the horizontal.

4. The method according to claim 1 including the step of supporting the balls between the bearing rings on an arcuate segment, and causing the balls to be distributed along the race surface of the outer ring by impinging a pressurized air or fluid thereon.

5. The method according to claim 1 including the step of slidably supporting the inner ring with respect to the outer ring, said ring being movable by the selected application of a pressurized air or fluid against the wall of its inner bore whereby it may be eccentrically positioned prior to receipt of the balls and centered thereafter.

6. Apparatus for assembling ball bearings comprising a supporting table for the inner and outer rings of said bearing, at least one delivery channel extending upwardly through the supporting table perpendicularly thereto to which balls are fed and piston reciprocating in said channel to elevate the balls into the crescent-shaped space between the eccentric bearing rings.

7. The apparatus according to claim 6 including means for feeding balls to the delivery channel.

8. The apparatus according to claim 6 wherein said delivery channel extends through an arcuate segment reciprocal into and out of the crescent-shaped space, the upper surface of the arcuate segment forming a supporting surface for the balls and cooperating with the race groove of the outer race ring to form a continuous supporting surface therewith.

9. The apparates according to claim 8 including a first nozzle having a pair of opposing outlet ports, being adapted to enter into the crescent-shaped space, said ports being adapted to allow a fluid to be impinged tangentially upon the race groove of the outer ring.

10. The apparatus according to claim 9 including a second nozzle having a pair of opposed outlet ports, said second nozzle being adapted to enter into the bore of the inner ring, said outlets being adapted to impinge fluid against the surface of the inner bore so as to radially shift the inner ring.

* * * * *